(12) United States Patent
Nagata et al.

(10) Patent No.: US 11,480,091 B2
(45) Date of Patent: Oct. 25, 2022

(54) EXHAUST GAS PURIFICATION SYSTEM (71) Applicant: TOYOTA JIDOSHA KABUSHIKI KAISHA, Toyota (JP)

(72) Inventors: Naoto Nagata, Toyota (JP); Kazushi Wakayama, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/540,741

(22) Filed: Dec. 2, 2021

(65) Prior Publication Data

US 2022/0228520 A1 Jul. 21, 2022

(30) Foreign Application Priority Data

Jan. 19, 2021 (JP) .............................. JP2021-006625

(51) Int. Cl.
*F01N 13/00* (2010.01)
*F01N 11/00* (2006.01)
(Continued)

(52) U.S. Cl.
CPC ......... *F01N 13/009* (2014.06); *B01D 53/945* (2013.01); *B01D 53/9477* (2013.01); *B01J 21/005* (2013.01); *B01J 23/58* (2013.01); *B01J 35/023* (2013.01); *B01J 35/1014* (2013.01); *B01J 35/1019* (2013.01); *F01N 3/101* (2013.01); *F01N 11/00* (2013.01); *B01D 2255/1021* (2013.01); *B01D 2255/1023* (2013.01); *B01D 2255/1025* (2013.01);
(Continued)

(58) Field of Classification Search
CPC ........ F01N 13/009; F01N 3/101; F01N 11/00; B01D 53/945; B01D 53/9477; B01D 2255/1021; B01D 2255/1023; B01D 2255/1025; B01D 2255/405; B01D 2255/9202; B01D 2255/9207; B01J 21/005; B01J 23/58; B01J 35/023; B01J 35/1014; B01J 35/1019
See application file for complete search history.

(56) References Cited

U.S. PATENT DOCUMENTS 10,533,472 B2 * 1/2020 Nazarpoor ............. B01J 23/464

FOREIGN PATENT DOCUMENTS

JP 2001-132440 A 5/2001

* cited by examiner

*Primary Examiner* — Brandon D Lee
(74) *Attorney, Agent, or Firm* — Sughrue Mion, PLLC (57) ABSTRACT

An exhaust gas purification system of the present disclosure includes a first exhaust gas purification device that purifies exhaust gas discharged from an internal combustion engine and a second exhaust gas purification device that additionally purifies the exhaust gas purified by the first exhaust gas purification device, wherein the exhaust gas is exhaust gas with a gaseous composition in which an amount of reducing agents is in excess compared to a stoichiometric gaseous composition and a gaseous composition in which an amount of oxidants is in excess compared to the stoichiometric gaseous composition are alternately switched between, the first exhaust gas purification device includes a three-way catalyst, and the second exhaust gas purification device includes an exhaust gas purification catalyst containing spinel-type $MgAl_xFe_{2.00-x}O_{4.00}$ supporting particles on which Rh is supported, where $0.00 < x \leq 1.50$.

7 Claims, 10 Drawing Sheets

(51) Int. Cl.
_B01D 53/94_ (2006.01)
_B01J 21/00_ (2006.01)
_B01J 23/58_ (2006.01)
_B01J 35/02_ (2006.01)
_B01J 35/10_ (2006.01)
_F01N 3/10_ (2006.01)

(52) U.S. Cl.
CPC .................. *B01D 2255/405* (2013.01); *B01D 2255/9202* (2013.01); *B01D 2255/9207* (2013.01)

EXHAUST GAS PURIFICATION SYSTEM

CROSS-REFERENCE TO RELATED APPLICATION

This application claims priority to Japanese Patent Application No. 2021-006625 filed on Jan. 19, 2021, incorporated herein by reference in its entirety.

BACKGROUND

1. Technical Field

The present disclosure relates to an exhaust gas purification system.

2. Description of Related Art

The exhaust gas discharged from internal combustion engines for automobiles and the like, for example, internal combustion engines such as gasoline engines and diesel engines contains components such as carbon monoxide (CO), hydrocarbons (HC), and nitrogen oxides ($NO_x$). Therefore, generally, an exhaust gas purification catalyst device for removing these components by purification is provided in a vehicle having an internal combustion engine, and these components are substantially removed by purification with an exhaust gas purification catalyst attached to in the exhaust gas purification catalyst device.

Regarding the configuration of the exhaust gas purification catalyst device, Japanese Unexamined Patent Application Publication No. 2001-132440 (JP 2001-132440 A) discloses an exhaust gas purification device in which a three-way catalyst is disposed on the upstream side and a $NO_x$ storage reduction catalyst is disposed on the downstream side.

SUMMARY

Ideally, exhaust gas from an internal combustion engine that performs combustion at an air-fuel ratio (theoretical air-fuel ratio) at which oxidants such as $NO_x$, and reducing agents such as CO and HC are generated in chemically equivalent proportions (in the present disclosure, referred to as "exhaust gas with a stoichiometric gaseous composition") reacts with a three-way catalyst in a ratio without excess or deficiencies, and is purified. However, actually, even in an internal combustion engine that is intended to perform combustion at a theoretical air-fuel ratio, the air-fuel ratio fluctuates in the vicinity of the stoichiometric value in its operation conditions. According to this fluctuation, the gaseous composition of the exhaust gas also fluctuates between a gaseous composition in which an amount of reducing agents such as CO and HC is in excess compared to a stoichiometric gaseous composition and a gaseous composition in which an amount of oxidants such as $O_2$ and $NO_x$ is in excess compared to the stoichiometric gaseous composition.

In order to reduce an amount of exhaust gas whose composition fluctuates, an oxygen absorbing and releasing material such as ceria that stores oxygen is generally used.

The disclosers examined use of an exhaust gas purification system that further includes a second exhaust gas purification device that additionally purifies the exhaust gas purified by a first exhaust gas purification device in addition to the first exhaust gas purification device using such a three-way catalyst.

In such an exhaust gas purification system, among $NO_x$, CO, and HC in the exhaust gas emitted from the internal combustion engine, gases that could not be completely removed by the first exhaust gas purification device are intended to be removed by purification in the second exhaust gas purification device.

Here, when exhaust gas from an engine has a gaseous composition in which an amount of oxidants such as $O_2$ and $NO_x$ is in excess compared to the stoichiometric gaseous composition, $O_2$ is consumed by the oxygen absorbing and releasing material in the first exhaust gas purification device. Therefore, the exhaust gas purified by the first exhaust gas purification device is exhaust gas containing $NO_x$ that could not be completely removed, that is, a $NO_x$ gaseous composition. This $NO_x$-containing gaseous composition flows into a second exhaust gas purification catalyst device.

On the other hand, when the exhaust gas from an engine has a gaseous composition in which an amount of reducing agents such as CO and HC is in excess compared to the stoichiometric gaseous composition, the exhaust gas purified by the first exhaust gas purification device is exhaust gas containing CO or HC that could not be completely removed, that is, a CO/HC-containing gaseous composition. This CO/HC-containing gaseous composition flows into the second exhaust gas purification catalyst device.

Therefore, the $NO_x$-containing gaseous composition and the CO/HC-containing gaseous composition alternately flow into the second exhaust gas purification device. Therefore, in the second exhaust gas purification device, $NO_x$ is not present at the same time as reducing agents such as CO/HC that can react therewith. Similarly, CO/HC is not present at the same time as oxidants such as $NO_x$ and $O_2$ that can react therewith. Therefore, it may be difficult to remove $NO_x$, CO, and HC that could not be completely removed by the first exhaust gas purification device by purification in the second exhaust gas purification device.

An object of the present disclosure is to provide an exhaust gas purification system that can efficiently remove $NO_x$, CO, and HC contained in exhaust gas which is emitted from an internal combustion engine and in which a gaseous composition in which an amount of reducing agents is in excess compared to a stoichiometric gaseous composition and a gaseous composition in which an amount of oxidants is in excess compared to the stoichiometric gaseous composition are alternately switched between.

The disclosers found that the above object can be achieved by the following aspects.

Aspect 1

An exhaust gas purification system that purifies exhaust gas discharged from an internal combustion engine, including:

a first exhaust gas purification device that purifies the exhaust gas; and a second exhaust gas purification device that additionally purifies the exhaust gas purified by the first exhaust gas purification device, wherein the exhaust gas is exhaust gas with a gaseous composition in which an amount of reducing agents is in excess compared to a stoichiometric gaseous composition and a gaseous composition in which an amount of oxidants is in excess compared to the stoichiometric gaseous composition are alternately switched between, wherein the first exhaust gas purification device includes a three-way catalyst, and wherein the second exhaust gas purification device includes an exhaust gas purification catalyst containing spinel-type $MgAl_xFe_{2.00-x}O_{4.00}$ supporting particles on which Rh is supported, where $0.00 < x \leq 1.50$.

Aspect 2

The exhaust gas purification system according to Aspect 1,
wherein $0.50 \leq x \leq 1.50$.

Aspect 3

The exhaust gas purification system according to Aspect 1 or 2,
wherein the amount of Rh supported in the exhaust gas purification catalyst with respect to the total mass of the exhaust gas purification catalyst is 0.1 mass % to 1.0 mass %.

Aspect 4

The exhaust gas purification system according to any one of Aspects 1 to 3,
wherein a lattice constant a of the spinel-type $MgAl_xFe_{2.00-x}O_{4.00}$ supporting particles is 8.10 Å to 8.35 Å.

Aspect 5

The exhaust gas purification system according to any one of Aspects 1 to 4,
wherein a crystallite diameter of the spinel-type $MgAl_xFe_{2.00-x}O_{4.00}$ supporting particles is 4 nm to 43 nm.

Aspect 6

The exhaust gas purification system according to any one of Aspects 1 to 5,
wherein a specific surface area of the spinel-type $MgAl_xFe_{2.00-x}O_{4.00}$ supporting particles according to a BET method is 11 m²/g to 150 m²/g.

Aspect 7

A vehicle in which the exhaust gas purification system according to any one of Aspects 1 to 6 is installed.

According to the exhaust gas purification system of the present disclosure, it is possible to efficiently remove $NO_x$, CO, and HC contained in exhaust gas which is emitted from an internal combustion engine and in which a gaseous composition in which an amount of reducing agents is in excess compared to a stoichiometric gaseous composition and a gaseous composition in which an amount of oxidants is in excess compared to the stoichiometric gaseous composition are alternately switched between.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described in detail. Here, the present disclosure is not limited to the following embodiments, and can be variously modified and implemented within the main scope of the present disclosure.

Exhaust Gas Purification System

An exhaust gas purification system of the present disclosure is an exhaust gas purification system that purifies exhaust gas discharged from an internal combustion engine, and includes a first exhaust gas purification device that purifies exhaust gas and a second exhaust gas purification device that additionally purifies the exhaust gas purified by the first exhaust gas purification device, the exhaust gas being exhaust gas with a gaseous composition in which an amount of reducing agents is in excess compared to a stoichiometric gaseous composition and a gaseous composition in which an amount of oxidants is in excess compared to the stoichiometric gaseous composition are alternately switched between, the first exhaust gas purification device including a three-way catalyst, the second exhaust gas purification device including an exhaust gas purification catalyst containing spinel-type $MgAl_xFe_{2.00-x}O_{4.00}$ supporting particles on which Rh is supported, where $0.00 < x \leq 1.50$.

Here, in the present disclosure, "x" in $MgAl_xFe_{2.00-x}O_{4.00}$ supporting particles and "x" in $NO_x$ are arbitrary values. In addition, the numerical value ranges of "x" referred to in the present disclosure are all related to "x" in $MgAl_xFe_{2.00-x}O_{4.00}$ supporting particles.

In addition, in the present disclosure, as described above, the exhaust gas with a "stoichiometric gaseous composition" is exhaust gas from an internal combustion engine that performs combustion at an air-fuel ratio (theoretical air-fuel ratio) at which oxidants such as $O_2$ and $NO_x$ and reducing agents such as CO and HC are generated in chemically equivalent proportions. Ideally, the exhaust gas reacts in a ratio without excess or deficiencies with a three-way catalyst and is purified. Therefore, the exhaust gas with a "gaseous composition in which an amount of reducing agents is in excess compared to the stoichiometric gaseous composition" is exhaust gas in which an amount of HC and CO is in excess compared to the composition of the exhaust gas with a stoichiometric gaseous composition. In addition, the exhaust gas with a "gaseous composition in which an amount of oxidants is in excess compared to the stoichiometric gaseous composition" is exhaust gas in which an amount of $O_2$ and $NO_x$ is in excess compared to the composition of the exhaust gas with a stoichiometric gaseous composition.

Figure 1:
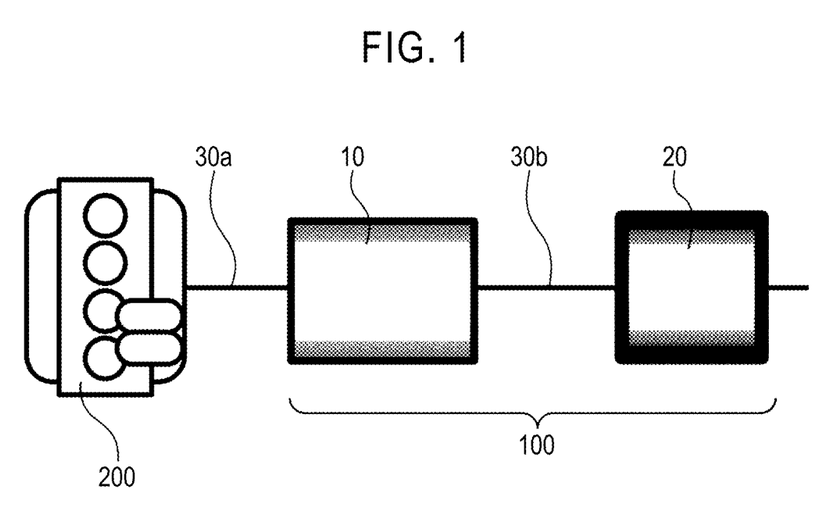
FIG. 1 is a schematic view showing an exhaust gas purification system 100 and an internal combustion engine 200 according to one embodiment of the present disclosure.

FIG. 1 shows an example of a specific configuration of an exhaust gas purification system of the present disclosure. FIG. 1 is a schematic view showing an exhaust gas purification system 100 and an internal combustion engine 200 according to one embodiment of the present disclosure.

As shown in FIG. 1, the exhaust gas purification system 100 according to one embodiment of the present disclosure includes a first exhaust gas purification device 10 that purifies exhaust gas emitted from the internal combustion engine 200 and a second exhaust gas purification device 20 that additionally purifies the exhaust gas purified by the first exhaust gas purification device 10. The first exhaust gas purification device 10 includes a three-way catalyst. In addition, the second exhaust gas purification device 20 includes an exhaust gas purification catalyst containing spinel-type $MgAl_xFe_{2.00-x}O_{4.00}$ supporting particles on which Rh is supported.

In FIG. 1, the internal combustion engine 200 and the first exhaust gas purification device 10 communicate with each other via a first flow path 30a. In addition, the first exhaust gas purification device 10 and the second exhaust gas purification device 20 communicate with each other via a second flow path 30b. Therefore, the exhaust gas discharged from the internal combustion engine 200 passes through the first flow path 30a, flows into the first exhaust gas purification device 10 and is purified. In addition, the exhaust gas purified by the first exhaust gas purification device 10 passes through the second flow path 30b, flows into the second exhaust gas purification device 20 and is additionally purified.

Here, there is no intention to limit the exhaust gas purification system of the present disclosure to that shown in FIG. 1.

Although not limited by this principle, the principle under which, according to the exhaust gas purification system of the present disclosure, it is possible to efficiently remove $NO_x$, CO, and HC contained in the exhaust gas emitted from the internal combustion engine in which a gaseous composition in which an amount of reducing agents is in excess compared to a stoichiometric gaseous composition and a gaseous composition in which an amount of oxidants is in excess compared to the stoichiometric gaseous composition are alternately switched between is considered to be as follows.

In the exhaust gas purification system of the present disclosure, exhaust gas emitted from the internal combustion engine is first purified with a three-way catalyst included in the first exhaust gas purification device.

Here, when the exhaust gas discharged from the internal combustion engine is exhaust gas with a gaseous composition in which an amount of reducing agents is in excess compared to the stoichiometric gaseous composition, there is a small amount of an oxidant that can react with CO or HC in the exhaust gas discharged from the internal combustion engine. Therefore, these components cannot be completely removed by the first exhaust gas purification device. Therefore, the exhaust gas containing CO and HC that could not be completely removed, that is, a CO/HC-containing gaseous composition, flows into the second exhaust gas purification device.

In addition, when the exhaust gas discharged from the internal combustion engine is exhaust gas with a gaseous composition in which an amount of oxidants is in excess compared to the stoichiometric gaseous composition, $O_2$ in the exhaust gas discharged from the internal combustion engine is consumed by the oxygen absorbing and releasing material in the first exhaust gas purification device. Therefore, there is a small amount of $O_2$ in the exhaust gas flowing into the second exhaust gas purification device. Therefore, the exhaust gas containing $NO_x$ that could not be completely removed by the first exhaust gas purification device, that is, a $NO_x$-containing gaseous composition, flows into the second exhaust gas purification device.

Therefore, it is thought that the CO/HC-containing gaseous composition and the $NO_x$-containing gaseous composition alternately flow into the second exhaust gas purification device.

Figure 2A:
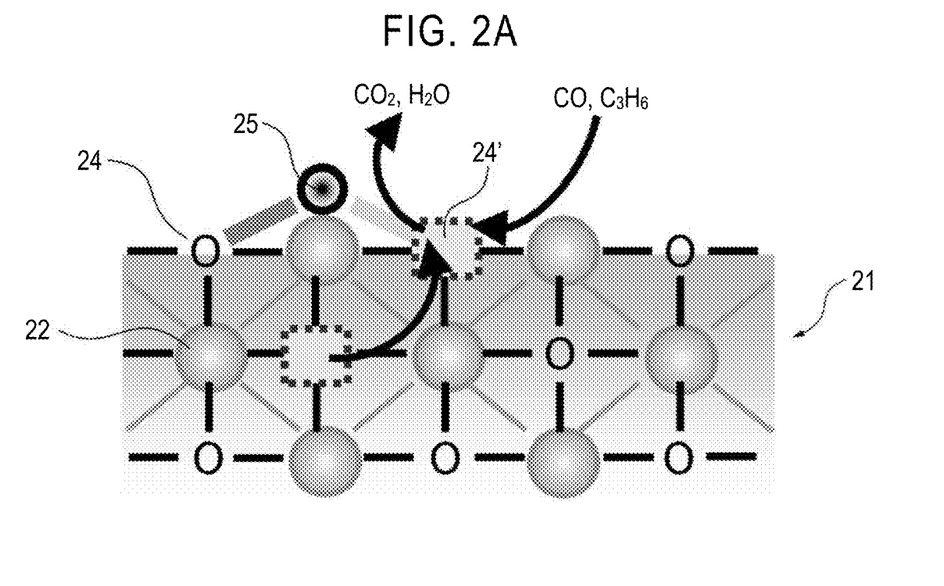
FIG. 2A is a schematic view showing a state in which a CO/HC-containing gaseous composition is removed by purification in spinel-type $MgAl_xFe_{2.00-x}O_{4.00}$ supporting particles on which Rh is supported.
Figure 2B:
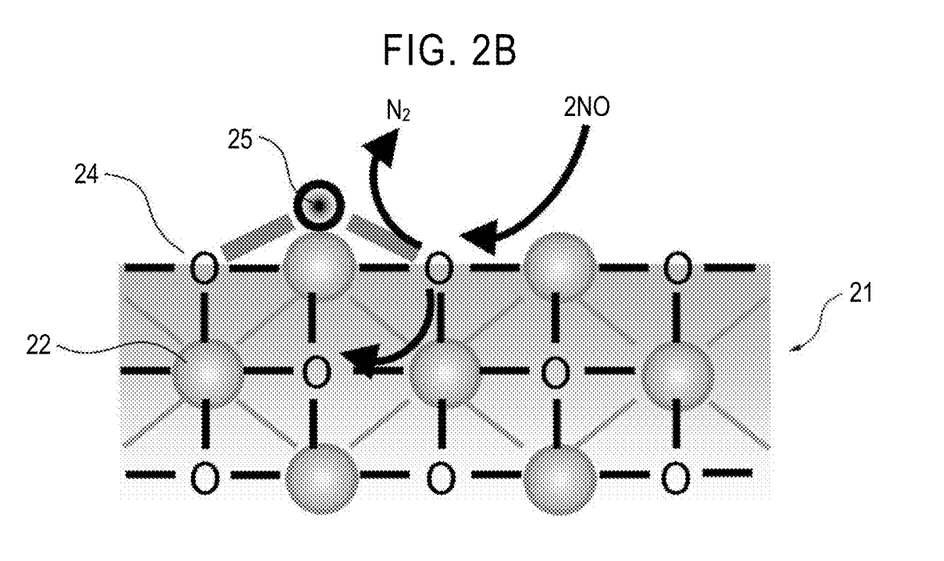
FIG. 2B is a schematic view showing a state in which a $NO_x$-containing gaseous composition is removed by purification in spinel-type $MgAl_xFe_{2.00-x}O_{4.00}$ supporting particles on which Rh is supported.

Here, as shown in FIGS. 2A and 2B, in the exhaust gas purification system of the present disclosure, the second exhaust gas purification device includes an exhaust gas purification catalyst containing spinel-type $MgAl_xFe_{2.00-x}O_{4.00}$ supporting particles 21 on which Rh 25 is supported. Here, the Rh 25 supported on the spinel-type $MgAl_xFe_{2.00-x}O_{4.00}$ supporting particles 21 may be particles, more specifically nanoparticles or clusters.

Therefore, when a CO/HC-containing gaseous composition flows into the second exhaust gas purification device, as shown in FIG. 2A, the spinel-type $MgAl_xFe_{2.00-x}O_{4.00}$ supporting particles 21 act as an oxidant. Specifically, when CO and HC are oxidized and converted into $CO_2$ and $H_2O$, at the same time, oxygen atoms 24 are desorbed from the spinel-type $MgAl_xFe_{2.00-x}O_{4.00}$ supporting particles 21, metals coordinated to the spinel type structure B site 22 are reduced, and at the same time, oxygen vacancies 24' are formed.

On the other hand, when a $NO_x$-containing gaseous composition flows into the second exhaust gas purification device, as shown in FIG. 2B, the spinel-type $MgAl_xFe_{2.00-x}O_{4.00}$ supporting particles 21 act as a reducing agent. Specifically, when $NO_x$ is reduced to $N_2$ or the like, at the same time, $NO_x$ allows oxygen atoms 24 to be received in the oxygen vacancies 24' of the spinel-type $MgAl_xFe_{2.00-x}O_{4.00}$ supporting particles 21.

In this manner, in the exhaust gas purification system of the present disclosure, when a CO/HC-containing gaseous composition flows into the second exhaust gas purification device, CO and HC can be removed, and when a $NO_x$-containing gaseous composition flows thereinto, $NO_x$ can be removed.

Here, Fe in the spinel-type $MgAl_xFe_{2.00-x}O_{4.00}$ supporting particles is easily redoxed by the interaction with each of Al and Rh. Therefore, the spinel-type $MgAl_xFe_{2.00-x}O_{4.00}$ supporting particles are easily reduced when a CO/HC-containing gaseous composition flows into the second exhaust gas purification device, and oxygen atoms are easily transferred to CO and HC. In addition, the spinel-type $MgAl_xFe_{2.00-x}O_{4.00}$ supporting particles are easily oxidized when a $NO_x$-containing gaseous composition flows into the second exhaust gas purification device, and easily receive oxygen from $NO_x$.

Therefore, the exhaust gas purification system of the present disclosure has high exhaust gas purification performance.

First Exhaust Gas Purification Device

The first exhaust gas purification device is a device that purifies exhaust gas with a gaseous composition in which an amount of reducing agents is excessive based on the stoichiometric gaseous composition and a gaseous composition in which an amount of oxidants is excessive based on the stoichiometric gaseous composition are alternately switched between, and which is emitted from the internal combustion engine. The first exhaust gas purification device includes a three-way catalyst.

The first exhaust gas purification device may communicate with the internal combustion engine, and specifically, the internal combustion engine and the first exhaust gas purification device may be connected to each other via a first flow path through which exhaust gas circulates.

Three-Way Catalyst

The three-way catalyst included in the first exhaust gas purification device can catalyze the oxidation reaction of HC and CO and the reduction reaction of $NO_x$ in the exhaust gas emitted from the internal combustion engine, and the catalyst is not particularly limited as long as it can remove these components in the exhaust gas at the same time. Examples of such a three-way catalyst include a catalyst in which precious metal particles such as Rh, Pt, and Pd are supported on metal oxide supporting particles containing a combination of alumina, ceria, and zirconia. In addition, the three-way catalyst can contain metal oxide particles having an oxygen storage function such as ceria.

Second Exhaust Gas Purification Device

The second exhaust gas purification device is a device that additionally purifies the exhaust gas purified by the first exhaust gas purification device. The second exhaust gas purification device includes an exhaust gas purification catalyst containing spinel-type $MgAl_xFe_{2.00-x}O_{4.00}$ supporting particles on which Rh is supported, where $0.00 < x \leq 1.50$.

The second exhaust gas purification device may communicate with the first exhaust gas purification device, and specifically, the first exhaust gas purification device and the second exhaust gas purification device may be connected to each other via a second flow path through which the exhaust gas purified by the first exhaust gas purification device circulates.

Exhaust Gas Purification Catalyst

The exhaust gas purification catalyst included in the second exhaust gas purification device contains spinel-type $MgAl_xFe_{2.00-x}O_{4.00}$ supporting particles on which Rh is supported. Here, $0.00 < x \leq 1.50$.

x may be more than 0.00, 0.10 or more, 0.20 or more, 0.30 or more, 0.40 or more, or 0.50 or more, and may be 1.50 or less, 1.40 or less, 1.30 or less, 1.20 or less, 1.10 or less, or 1.00 or less. In order to more efficiently remove $NO_x$, CO, and HC, $0.50 \leq x \leq 1.50$ is particularly preferable.

Rh can be supported on the spinel-type $MgAl_xFe_{2.00-x}O_{4.00}$ supporting particles in the form of particles, more specifically nanoparticles or clusters.

The amount of Rh supported with respect to the total mass of the exhaust gas purification catalyst may be 0.01 mass % to 5.00 mass %.

The amount of Rh supported with respect to the total mass of the exhaust gas purification catalyst may be 0.01 mass % or more, 0.03 mass % or more, 0.05 mass % or more, 0.10 mass % or more, 0.30 mass % or more, or 0.50 mass % or more, and may be 5.00 mass % or less, 4.00 mass % or less, 3.00 mass % or less, 2.00 mass % or less, or 1.00 mass % or less.

In consideration of cost and performance of a catalyst, the amount of Rh supported with respect to the total mass of the exhaust gas purification catalyst is particularly preferably 0.1 mass % to 1.0 mass %.

Here, the spinel-type $MgAl_xFe_{2.00-x}O_{4.00}$ supporting particles may be monophasic. In addition, the spinel-type $MgAl_xFe_{2.00-x}O_{4.00}$ supporting particles can have a composition deviating from $Mg:Al+Fe:O=1.0:2.0:4.0$ within a range of having a spinel structure. Here, the spinel-type $MgAl_xFe_{2.00-x}O_{4.00}$ supporting particles can have a structure in which Fe at the B site is replaced by Al.

That is, within the range having a spinel structure, the proportion of Mg in the formula may be larger than or smaller than 1. Similarly, within the range having a spinel structure, the proportion of Al+Fe in the formula may be larger than or smaller than 2. Similarly, within the range having a spinel structure, the proportion of O in the formula may be larger than or smaller than 4.

The lattice constant a of the spinel-type $MgAl_xFe_{2.00-x}O_{4.00}$ supporting particles may be 8.10 Å to 8.35 Å. Here, when the molar ratio of Al with respect to the total amount of Al and Fe is smaller, the lattice constant a tends to be larger. In addition, when the molar ratio of Al with respect to the total amount of Al and Fe is larger, the lattice constant a tends to be smaller.

The lattice constant a may be 8.10 Å or more, 8.20 Å or more, or 8.30 Å or more, and may be 8.35 Å or less, 8.34 Å or less, or 8.33 Å or less.

The lattice constant a can be calculated based on an X-ray diffraction pattern obtained by an X-ray diffraction method.

The crystallite diameter of the spinel-type $MgAl_xFe_{2.00-x}O_{4.00}$ supporting particles may be 4 nm to 43 nm. Here, when the molar ratio of Al with respect to the total amount of Al and Fe is smaller, the crystallite diameter tends to be larger. In addition, when the molar ratio of Al with respect to the total amount of Al and Fe is larger, the crystallite diameter tends to be smaller.

The crystallite diameter may be 4 nm or more, 5 nm or more, 6 nm or more, 7 nm or more, or 8 nm or more, and may be 43 nm or less, 35 nm or less, 25 nm or less, 15 nm or less, or 10 nm or less.

The crystallite diameter can be calculated based on an X-ray diffraction pattern obtained by the X-ray diffraction method.

The specific surface area of the spinel-type $MgAl_xFe_{2.00-x}O_{4.00}$ supporting particles according to the BET method may be 11 $m^2/g$ to 150 $m^2/g$. Here, when the molar ratio of Al with respect to the total amount of Al and Fe is smaller, the crystallite diameter tends to be smaller. In addition, when the molar ratio of Al with respect to the total amount of Al and Fe is larger, the crystallite diameter tends to be larger.

The specific surface area according to the BET method may be 11 m$^2$/g or more, 25 m$^2$/g or more, 50 m$^2$/g or more, or 75 m$^2$/g or more, and may be 150 m$^2$/g or less, 125 m$^2$/g or less, 100 m$^2$/g or less, or 75 m$^2$/g or less.

The specific surface area according to the BET method can be measured, for example, using a BELSORP-max-12-N-VP (commercially available from Bel Japan, Inc.), according to a BET method under 77 K conditions by a nitrogen adsorption and desorption method. The sample for measurement may be pre-treated in a vacuum at 250° C. for 3 hours. The specific surface area can be calculated from the straight line portion of the BET curve.

Method of Producing Exhaust Gas Purification Catalyst

Spinel-type MgAl$_x$Fe$_{2.00-x}$O$_{4.00}$ supporting particles on which Rh is supported can be produced when Rh is supported on spinel-type MgAl$_x$Fe$_{2.00-x}$O$_{4.00}$ supporting particles.

A method of producing spinel-type MgAl$_x$Fe$_{2.00-x}$O$_{4.00}$ supporting particles is not particularly limited. The spinel-type MgAl$_x$Fe$_{2.00-x}$O$_{4.00}$ supporting particles can be prepared by an appropriate method for preparing a composite oxide, for example, a coprecipitation method, a citric acid complex method, or an alkoxide method.

More specifically, spinel-type MgAl$_x$Fe$_{2.00-x}$O$_{4.00}$ supporting particles can be obtained by dissolving magnesium nitrate hexahydrate, aluminum nitrate nonahydrate, and iron nitrate nonahydrate at a predetermined ratio in distilled water, then dissolving in citric acid, heating and stirring to obtain a slurry, and drying and firing the slurry.

A method for supporting Rh on spinel-type MgAl$_x$Fe$_{2.00-x}$O$_{4.00}$ supporting particles is not particularly limited, and any method by which a catalyst metal can be supported on a carrier can be used. Specifically, this can be performed by dispersing spinel-type MgAl$_x$Fe$_{2.00-x}$O$_{4.00}$ supporting particles in a solution containing a predetermined concentration of Rh, for example, in a rhodium nitrate aqueous solution, and performing drying and firing.

Vehicle

The exhaust gas purification system of the present disclosure is installed in a vehicle of the present disclosure.

The vehicle is not particularly limited as long as it uses gasoline as a fuel, and may be, for example, a gasoline vehicle or a hybrid vehicle.

EXAMPLES 1 TO 3 AND COMPARATIVE EXAMPLES 1 TO 3

Example 1: Rh-Supported MgAl$_{0.50}$Fe$_{1.50}$O$_{4.00}$ 12.82 g (0.05 mol) of magnesium nitrate hexahydrate (Mg(NO$_3$)$_2$·6H$_2$O), 9.38 g (0.025 mol) of aluminum nitrate nonahydrate (Al(NO$_3$)$_3$·9H$_2$O), and 30.30 g (0.075 mol) of iron nitrate nonahydrate (Fe(NO$_3$)$_3$·9H$_2$O) were dissolved in 100 mL of distilled water and then dissolved in 28.82 g (0.15 mol) of citric acid. The solution was heated and stirred at 85° C. for 4 hours, and the obtained slurry was dried at 120° C. for 8 hours to obtain a paste. The obtained paste was calcined at 300° C. for 2 hours and then fired at 750° C. for 5 hours to obtain a powder.

The obtained powder was added to and dispersed in the rhodium nitrate solution so that the amount of rhodium (Rh) supported was 0.5 mass %. Then, the rhodium nitrate solution was heated with stirring, and evaporated to obtain a precipitate. The precipitate was dried at 120° C. for 12 hours and then fired in an electric furnace at 500° C. for 2 hours to obtain a powder. The powder was compacted and molded at 2 t/cm$^2$ to prepare a φ1.0 to 1.7 mm evaluation pellet.

This was used as a sample of Example 1.

Example 2: Rh-Supported MgAl$_{1.00}$Fe$_{1.00}$O$_{4.00}$

A sample of Example 2 was obtained in the same manner as in Example 1 except that the amount of aluminum nitrate nonahydrate was 18.76 g (0.05 mol) and the amount of iron nitrate nonahydrate was 20.20 g (0.05 mol).

Example 3: Rh-Supported MgAl$_{1.50}$Fe$_{0.50}$O$_{4.00}$

A sample of Example 3 was obtained in the same manner as in Example 1 except that the amount of aluminum nitrate nonahydrate was 28.13 g (0.075 mol) and the amount of iron nitrate nonahydrate was 10.10 g (0.025 mol).

Comparative Example 1: Rh-Supported MgFe$_{2.00}$O$_{4.00}$

A sample of Comparative Example 1 was obtained in the same manner as in Example 1 except that no aluminum nitrate nonahydrate was used and the amount of iron nitrate nonahydrate was 40.40 g (0.10 mol).

Comparative Example 2: Rh-Supported MgAl$_{2.00}$O$_{4.00}$

A sample of Comparative Example 2 was obtained in the same manner as in Example 1 except that no iron nitrate nonahydrate was used and the amount of aluminum nitrate nonahydrate was 37.51 g (0.10 mol).

Comparative Example 3: Rh-Supported Ce—ZrO$_2$

A sample in which 0.5 mass % of rhodium was supported on a cerium oxide-zirconium composite oxide (Ce/Zr=3/7, SBET=70 m$^2$/g) was used as a sample of Comparative Example 3.

X-Ray Diffraction Test and Specific Surface Area Measurement

For the samples of Examples 1 to 3 and Comparative Examples 1 and 2, structural analysis according to the X-ray diffraction test and measurement of the specific surface area according to the BET method were performed.

Method

Structural analysis according to the X-ray diffraction test was performed using RINT2000 (commercially available from Rigaku Corporation), the X-ray source was CuKα (λ=1.5418 nm), the scanning range was 10 to 90 deg, the step width was 0.02 deg, the tube voltage was 50 kV, and the tube current was 300 mA. In addition, the diffraction peak position was compared with the known data in the JCPDS data file.

The specific surface area was measured by the nitrogen adsorption and desorption method at a temperature of 77K using a BELSORP-max-12-N-VP (commercially available from Bel Japan, Inc.). Each sample was treated in a vacuum at 250° C. for 3 hours. In addition, the specific surface area was calculated from the straight line portion of the BET curve.

Results

Figure 3:
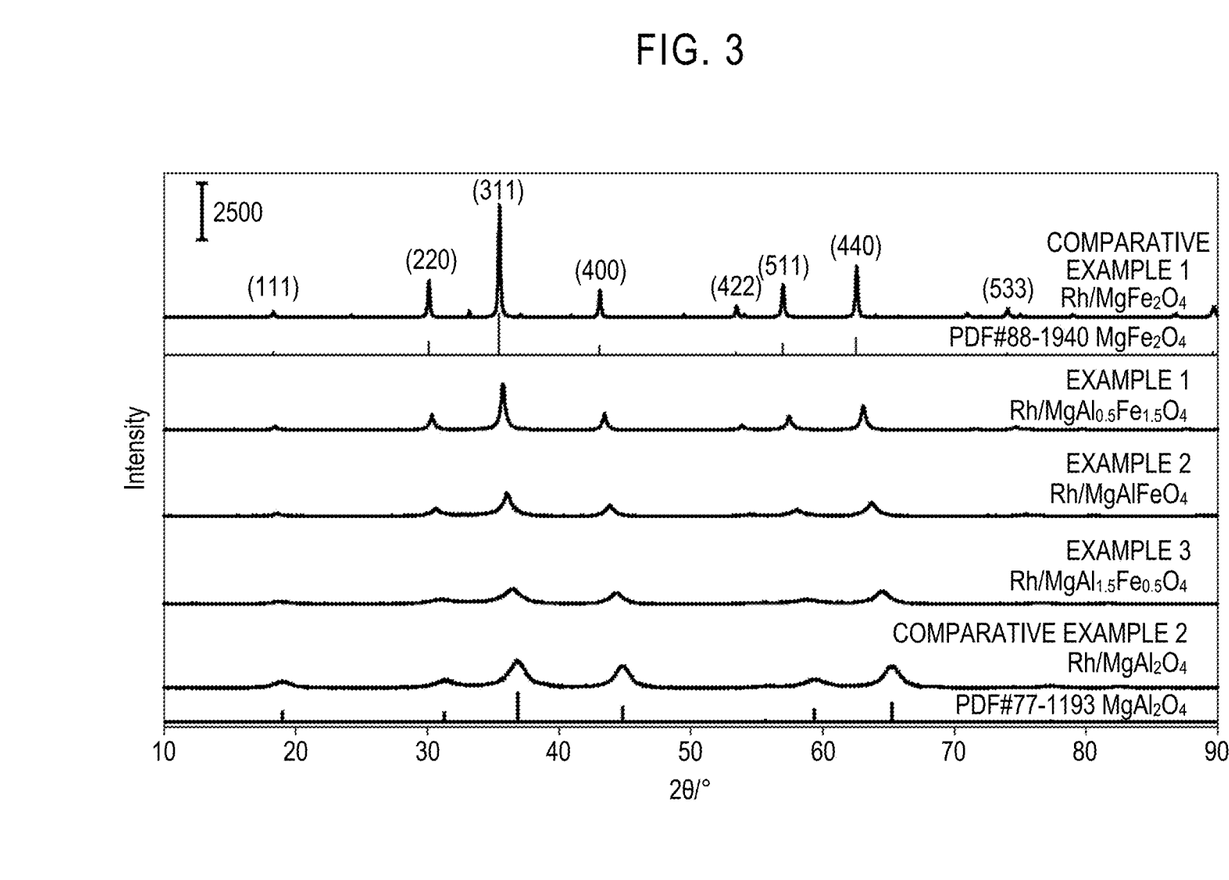
FIG. 3 shows XRD diffraction patterns for samples of Examples 1 to 3 and Comparative Examples 1 and 2.

FIG. 3 shows the results of the X-ray diffraction test.

FIG. 3 shows XRD diffraction patterns for samples of examples.

As shown in FIG. 3, diffractive lines specific to spinel type oxides were detected from the diffraction patterns for the samples of all the examples. Therefore, it can be said that almost monophasic spinel type oxides were obtained in the examples.

Figure 4:
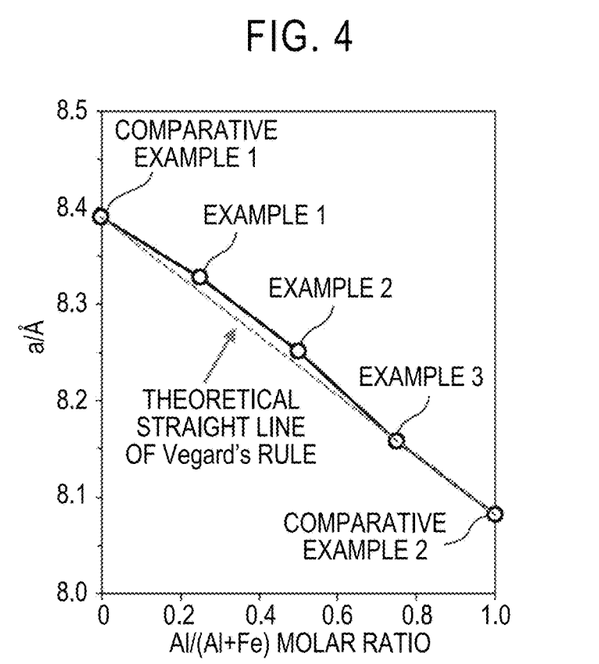
FIG. 4 is a graph showing the relationship between a lattice constant a and a molar ratio of Al with respect to a total amount of Fe and Al for the samples of Examples 1 to 3 and Comparative Examples 1 and 2.
Figure 5:
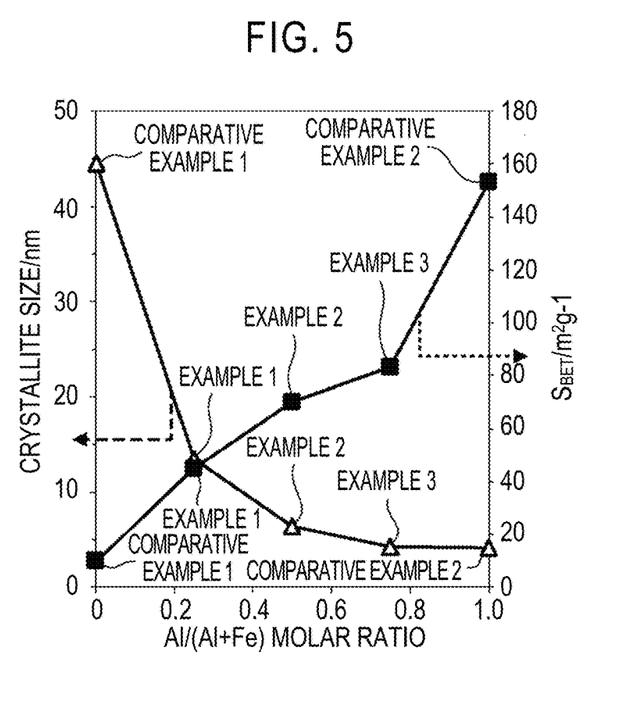
FIG. 5 is a graph showing the relationship between a crystallite diameter and a specific surface area according to a BET method, and a molar ratio of Al with respect to a total amount of Fe and Al for the samples of Examples 1 to 3 and Comparative Examples 1 and 2.

In addition, the lattice constant a and the crystallite diameter calculated from the XRD diffraction patterns of the samples of the examples and the measurement results of the specific surface areas are summarized in Table 1, and FIGS. 4 and 5.

TABLE 1

| Example | Composition A/Al + Fe (molar ratio) | Lattice constant a (Å) | Results Crystallite diameter (nm) | Specific surface area (m$^2$/g) |
|---|---|---|---|---|
| Comparative Example 1 | 0.00 | 8.39 | 44 | 10 |
| Example 1 | 0.25 | 8.33 | 13 | 48 |
| Example 2 | 0.50 | 8.25 | 6 | 70 |
| Example 3 | 0.75 | 8.16 | 4 | 82 |
| Comparative Example 2 | 1.00 | 8.08 | 4 | 155 |

FIG. 4 is a graph showing the relationship between the lattice constant a and the molar ratio of Al with respect to the total amount of Fe and Al for the samples of the examples. In addition, FIG. 5 shows a graph showing the relationship between the crystallite diameter and the specific surface area according to the BET method, and the molar ratio of Al with respect to the total amount of Fe and Al for the samples of the examples.

As shown in Table 1 and FIG. 4, in Comparative Example 1 in which the molar ratio of Al with respect to the total amount of Fe and Al was 0, the lattice constant a was 8.39 Å. Then, as in the samples of Examples 1 to 3 and Comparative Example 2, as the molar ratio of Al with respect to the total amount of Fe and Al increased, the lattice constant a decreased to 8.33 Å (Example 1), 8.25 Å (Example 2), 8.15 Å (Example 3), and 8.08 Å (Comparative Example 2) in that order. This follows Vegard's theoretical straight line. This result showed that Fe at the B site was replaced by Al as the proportion of Al increased.

In addition, as shown in Table 1 and FIG. 5, in Comparative Example 1 in which the molar ratio of Al with respect to the total amount of Fe and Al was 0, the crystallite diameter was 44 nm. Then, as in the samples of Examples 1 to 3 and Comparative Example 2, the crystallite diameter decreased to 13 nm (Example 1), 6 nm (Example 2), 4 nm (Example 3), and 4 nm (Comparative Example 2) in that order as the molar ratio of Al with respect to the total amount of Fe and Al increased.

In addition, as shown in Table 1 and FIG. 5, in Comparative Example 1 in which the molar ratio of Al with respect to the total amount of Fe and Al was 0, the specific surface area was 10 m$^2$/g. Then, as in the samples of Examples 1 to 3 and Comparative Example 2, as the molar ratio of Al with respect to the total amount of Fe and Al increased, the specific surface area increased to 48 m$^2$/g (Example 1), 70 m$^2$/g (Example 2), 82 m$^2$/g (Example 3), and 155 m$^2$/g (Comparative Example 2) in that order.

Observation Under Scanning Electron Microscope (SEM)

The samples of Examples 1 to 3, and Comparative Examples 1 and 2 were observed under a scanning electron microscope (SEM).

Method

JEM-1000 (commercially available from JEOL) (acceleration voltage: 200 kV) was used for observation. In addition, the samples were dispersed in ethanol, added dropwise to a copper grid, and then dried and observed.

Results

FIGS. 6A to 6E show the SEM images of the samples of Comparative Example 1, Examples 1 to 3, and Comparative Example 2 in that order.

Figure 6A:
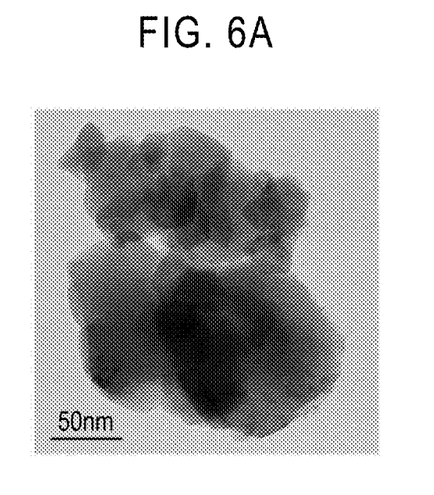
FIG. 6A is a scanning electron microscope (SEM) image of the sample of Comparative Example 1.
Figure 6B:
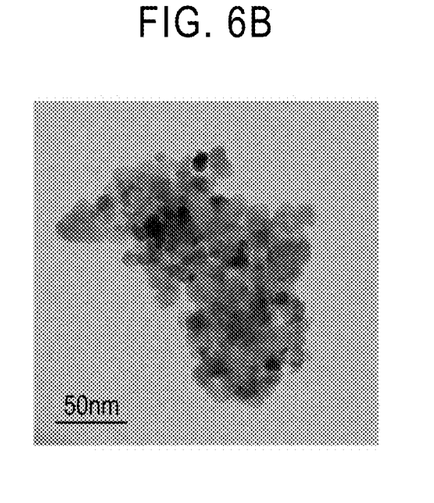
FIG. 6B is a scanning electron microscope (SEM) image of the sample of Example 1.
Figure 6C:
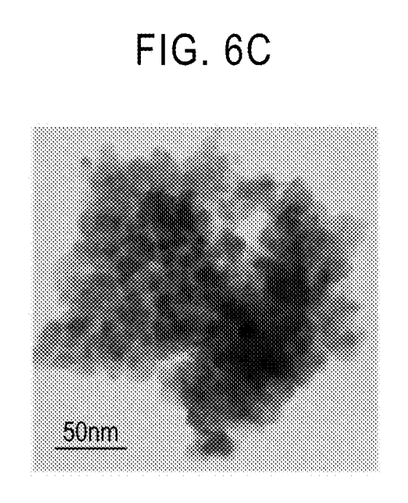
FIG. 6C is a scanning electron microscope (SEM) image of the sample of Example 2.
Figure 6D:
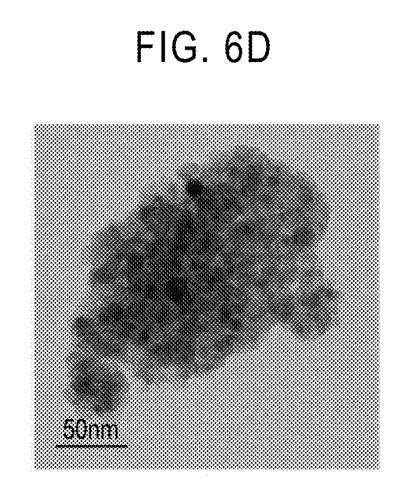
FIG. 6D is a scanning electron microscope (SEM) image of the sample of Example 3.
Figure 6E:
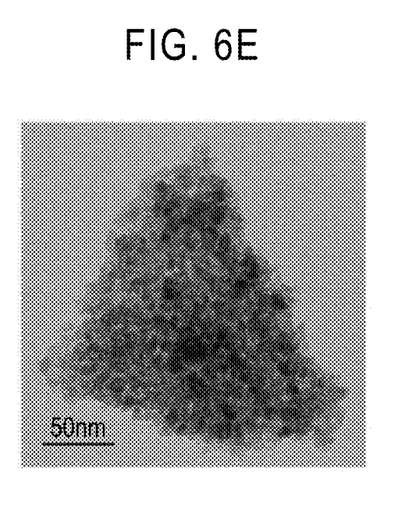
FIG. 6E is a scanning electron microscope (SEM) image of the sample of Comparative Example 2.

As shown in FIG. 6A, the sample of Comparative Example 1 in which the molar ratio of Al with respect to the total amount of Fe and Al was 0 had particles having a size exceeding several tens of nm. On the other hand, as shown in FIGS. 6B to 6E, as in the samples of Examples 1 to 3 and Comparative Example 2, as the molar ratio of Al with respect to the total amount of Fe and Al increased, the particles tended to be smaller. This result matched the result shown in FIG. 5 in which the crystallite diameter decreased as the molar ratio of Al with respect to the total amount of Fe and Al increased.

Evaluation of NO$_x$ Reducing Activity

The NO$_x$ reducing activity of the samples of Examples 1 to 3 and Comparative Examples 1 to 3 was evaluated.

Method

The NO$_x$ reducing activity was evaluated by placing a sample (4 g) of each example in a flow type reactor, and analyzing conversion behavior of each gas with an FT-IR analyzer (SESAM-HL, commercially available from Best Instruments Co., Ltd.). Specifically, after a reduction pretreatment was performed at 450° C. for 5 minutes, a cycle in which a NO-containing gaseous composition and a CO/HC-containing gaseous composition (nitrogen gas balance) shown in the following Table 2 were alternately introduced at 20 L/min for 60 seconds was repeated five times, and the average values of the amounts of NO$_x$ reduced during introduction of the NO-containing gaseous composition in 2 to 5 cycles were compared. The evaluation was performed at a temperature of 450° C. or 300° C. When the evaluation temperature was changed, 1% H$_2$/N$_2$ was circulated at the same flow rate.

TABLE 2

| Type of gas | Composition of gas (vol %) | | | | | | |
|---|---|---|---|---|---|---|---|
| | $H_2$ | NO | CO | $C_3H_6$ | $H_2O$ | $CO_2$ | $N_2$ |
| Pretreatment gas | 1 | — | — | — | — | — | Balance |
| NO-containing gaseous composition | — | 0.2 | — | — | 4 | 10 | Balance |
| CO/HC-containing gaseous composition | — | — | 0.1 | 0.011 | 4 | 10 | Balance |

Results

Figure 7:
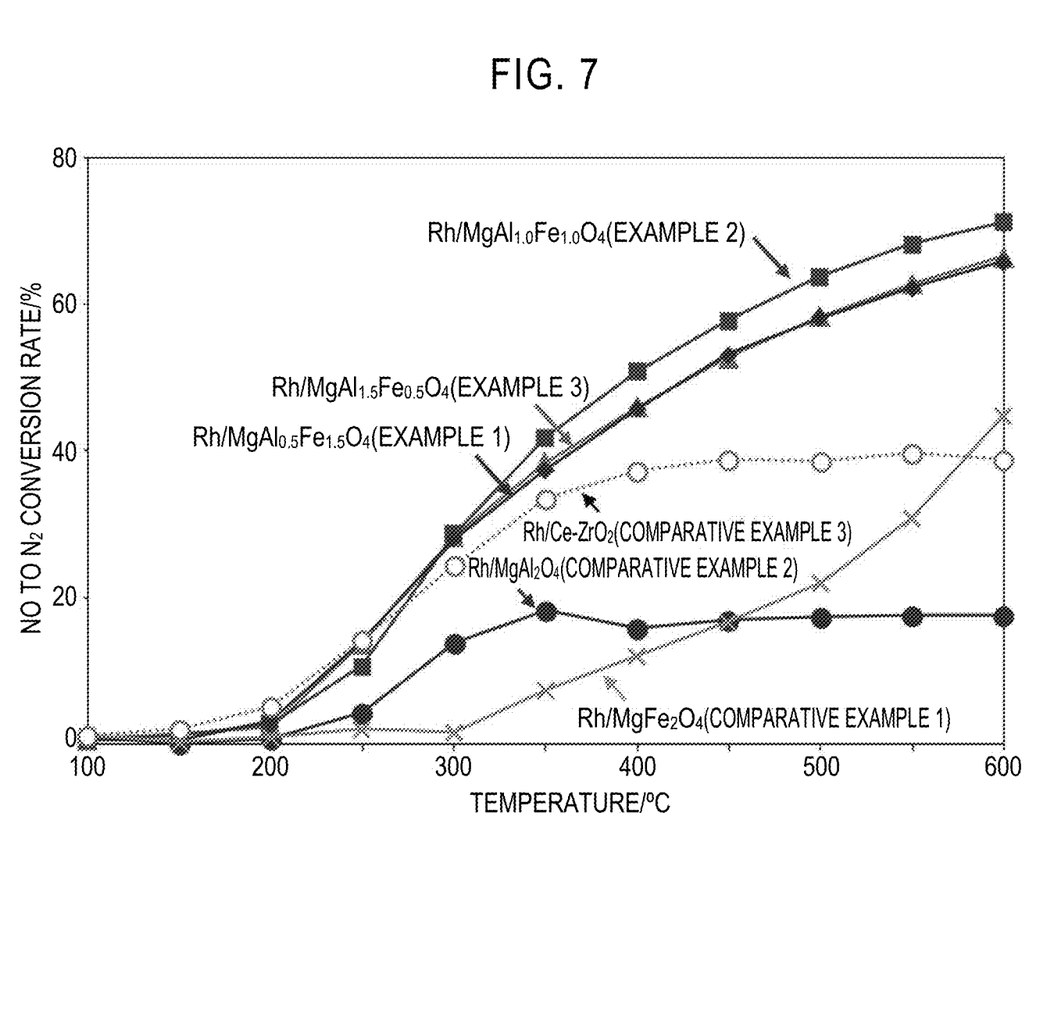
FIG. 7 is a graph showing the results of a $NO_x$ reduction activity test for the samples of Examples 1 to 3 and Comparative Examples 1 to 3.

FIG. 7 shows the evaluation results of $NO_x$ reducing activity.

FIG. 7 is a graph showing the $NO_x$ reduction activity test results of the samples of Examples 1 to 3 and Comparative Examples 1 to 3.

As shown in FIG. 7, Examples 1 to 3 in which the molar ratio of Al with respect to the total amount of Fe and Al was 0.25, 0.50 and 0.75 exhibited higher $NO_x$ reduction performance than Comparative Examples 1 and 2 in which the molar ratio of Al with respect to the total amount of Fe and Al was 0.00 or 1.00. In addition, Examples 1 to 3 exhibited higher $NO_x$ reduction performance than Comparative Example 3 in which 0.5 mass % of rhodium was supported on the cerium oxide-zirconium composite oxide (Ce/Zr=3/7, SBET=70 m²/g). Here, as shown in FIG. 7, Example 2 in which the molar ratio of Al with respect to the total amount of Fe and Al was 0.50 exhibited particularly high $NO_x$ reduction performance.

$H_2$-TPR Test

The $H_2$-TPR test was performed on the samples of Examples 1 to 3 and Comparative Examples 1 to 3.

Method

BelcatA (commercially available from Bel Japan, Inc.) was used for measurement. About 50 mg of a sample powder of each example was accurately weighed and introduced into a sample tube. Then, the temperature was raised to 600° C. while circulating a gaseous composition including 20 vol % of $O_2$ and the balance of He in the sample tube at a flow rate of 30 mL/min, and the temperature was then maintained for 10 minutes, and cooling was then performed to about −80° C. under the same gaseous composition. After the gaseous composition was replaced with Ar gas at −80° C., while circulating a gaseous composition including 5 vol % of $H_2$ and the balance of Ar in the sample tube at a flow rate of 30 mL/min, the temperature was raised to 600° C. while heating the sample at 10° C./min, and thus the amount of $H_2$ consumed was analyzed. The analysis was performed with a thermal conductivity detector (TCD). A desiccant was provided in front of the TCD and produced water was trapped. The same analysis was performed using CuO powder, and the amount of $H_2$ consumed of each sample was quantified.

In addition, for the samples of Examples 1 to 3 and Comparative Examples 1 to 3, the $H_2$-TPR test was performed in the same manner on samples in which no Rh was supported, and the amount of $H_2$ consumed was quantified.

Results

Figure 8:
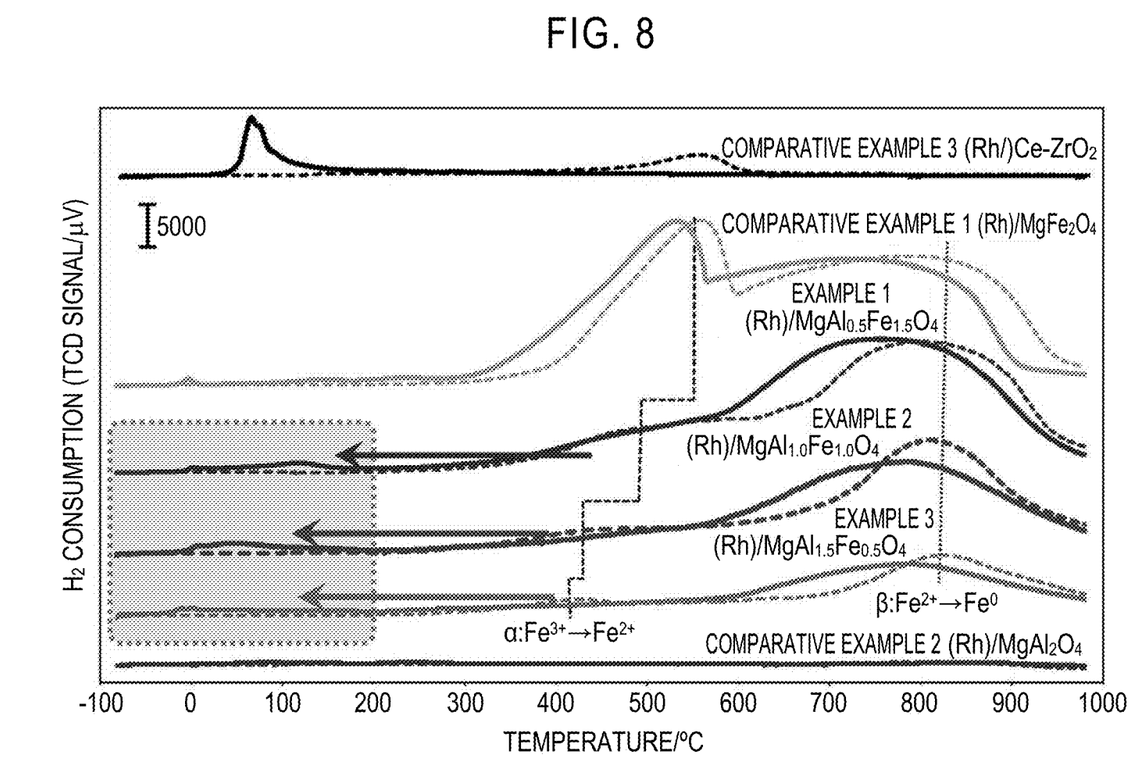
FIG. 8 is a graph showing the results of $H_2$-TPR analysis for the samples of Examples 1 to 3 and Comparative Examples 1 to 3.
Figure 9:
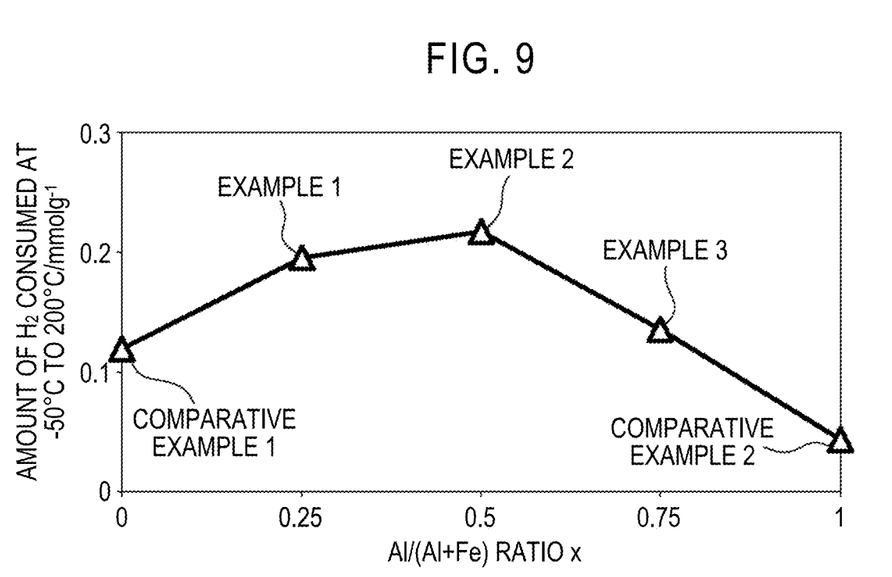
FIG. 9 is a graph showing the relationship between an amount of $H_2$ consumed at −50° C. to 200° C. in $H_2$-TPR analysis and a molar ratio of Al with respect to a total amount of Fe and Al for the samples of Examples 1 to 3 and Comparative Examples 1 and 2.

FIGS. 8 and 9 show the $H_2$-TPR test results.

FIG. 8 is a graph showing the $H_2$-TPR analysis results of the samples of Examples 1 to 3 and Comparative Examples 1 to 3.

In FIG. 8, the solid lines indicate $H_2$-TPR test results of the samples of the examples. In addition, the dotted lines indicate $H_2$-TPR test results of samples in which no Rh was supported for the samples of the examples.

For the sample of Comparative Example 1, when referring to the hydrogen consumption profiles (parts indicated by the dotted lines) of the samples in which no Rh was supported, that is, the $MgFe_{2.00}O_{4.00}$ supporting particles, two broad hydrogen consumptions with peaks at about 550° C. and about 810° C. were detected. The former of the peaks was assumed to be derived from one-electron reduction from $Fe^{3+}$ to $Fe^{2+}$. In addition, the latter of the peaks was assumed to be derived from two-electron reduction from $Fe^{2+}$ to Fe.

These two peaks were also detected in samples in which no Rh was supported for the samples of Examples 1 to 3, that is, $MgAl_{0.50}Fe_{1.50}O_4$ supporting particles, $MgAl_{1.00}Fe_{1.00}O_4$ supporting particles, and $MgAl_{1.50}Fe_{0.50}O_4$ supporting particles in order. However, the peak on the low temperature side (peak assumed to be derived from one-electron reduction from $Fe^{3+}$ to $Fe^{2+}$) of these peaks shifted to a lower temperature side as the molar ratio of Al with respect to the total amount of Fe and Al increased and the intensity decreased. This result showed that, when Al was introduced, $Fe^{3+}$ was easily reduced according to the interaction via lattice oxygen.

In addition, in the samples of Examples 1 to 3, and the samples in which Rh was supported on $MgAl_{0.50}Fe_{1.50}O_4$ supporting particles, $MgAl_{1.00}Fe_{1.00}O_4$ supporting particles, and $MgAl_{1.50}Fe_{0.50}O_4$ supporting particles, the peak on the low temperature side shifted to a lower temperature side, that is, a region of −50° C. to 200° C.

This result showed that, when Rh was supported on $MgAl_xFe_{2.00-x}O_{4.00}$ supporting particles, $Fe^{3+}$ was additionally easily reduced by one-electron according to the interaction between Rh and Fe, that is, oxygen vacancies were easily formed.

Next, FIG. 9 is a graph showing the relationship between the amount of $H_2$ consumed at −50° C. to 200° C. in the $H_2$-TPR analysis and the molar ratio of Al with respect to the total amount of Fe and Al for the samples of Examples 1 to 3 and Comparative Examples 1 and 2.

As shown in FIG. 9, as the molar ratio of Al with respect to the total amount of Fe and Al increased, the sample of Example 2, that is, the sample in which Rh was supported on $MgAl_{1.00}Fe_{1.00}O_{4.00}$ supporting particles, was on the top in the mountain-shaped hierarchy. This tendency matched the results of FIG. 7 regarding the evaluation of the $NO_x$ reducing activity, and supported the fact that sites that could be reduced at 200° C. or lower became active sites, and were involved in NO removal.

What is claimed is:

1. An exhaust gas purification system that purifies exhaust gas discharged from an internal combustion engine, comprising:
   a first exhaust gas purification device that purifies the exhaust gas; and
   a second exhaust gas purification device that additionally purifies the exhaust gas purified by the first exhaust gas purification device,
   wherein the exhaust gas is exhaust gas with a gaseous composition in which an amount of reducing agents is in excess compared to a stoichiometric gaseous composition and a gaseous composition in which an amount of oxidants is in excess compared to the stoichiometric gaseous composition are alternately switched between, wherein the first exhaust gas purification device includes a three-way catalyst, and wherein the second exhaust gas purification device includes an exhaust gas purification catalyst containing spinel-type $MgAl_xFe_{2.00-x}O_{4.00}$ supporting particles on which Rh is supported, where $0.00 < x \leq 1.50$.

2. The exhaust gas purification system according to claim 1, wherein $0.5 \leq x \leq 1.5$.

3. The exhaust gas purification system according to claim 1, wherein the amount of Rh supported in the exhaust gas purification catalyst with respect to the total mass of the exhaust gas purification catalyst is 0.1 mass % to 1.0 mass %.

4. The exhaust gas purification system according to claim 1, wherein a lattice constant a of the spinel-type $MgAl_xFe_{2.00-x}O_{4.00}$ supporting particles is 8.10 Å to 8.35 Å.

5. The exhaust gas purification system according to claim 1, wherein a crystallite diameter of the spinel-type $MgAl_xFe_{2.00-x}O_{4.00}$ supporting particles is 4 nm to 43 nm.

6. The exhaust gas purification system according to claim 1, wherein a specific surface area of the spinel-type $MgAl_xFe_{2.00-x}O_{4.00}$ supporting particles according to a BET method is 11 $m^2/g$ to 150 $m^2/g$.

7. A vehicle in which the exhaust gas purification system according to claim 1 is installed.

* * * * *